United States Patent
Nissan et al.

(10) Patent No.: US 9,922,643 B2
(45) Date of Patent: Mar. 20, 2018

(54) USER-AIDED ADAPTATION OF A PHONETIC DICTIONARY

(71) Applicant: NICE-SYSTEMS LTD, Ra'anana (IL)

(72) Inventors: Maor Nissan, Herzeliya (IL); Ronny Bretter, Kiriyat Motzkin (IL)

(73) Assignee: NICE LTD., Ra'anana (IL)

( * ) Notice: Subject to any disclaimer, the term of this patent is extended or adjusted under 35 U.S.C. 154(b) by 213 days.

(21) Appl. No.: 14/580,331

(22) Filed: Dec. 23, 2014

(65) Prior Publication Data

US 2016/0180835 A1    Jun. 23, 2016

(51) Int. Cl.
| | |
|---|---|
| G06F 17/20 | (2006.01) |
| G06F 17/21 | (2006.01) |
| G06F 17/27 | (2006.01) |
| G06F 17/28 | (2006.01) |
| G10L 15/06 | (2013.01) |
| G10L 15/02 | (2006.01) |
| G10L 15/187 | (2013.01) |

(52) U.S. Cl.
CPC .......... *G10L 15/063* (2013.01); *G10L 15/187* (2013.01); *G10L 2015/025* (2013.01); *G10L 2015/0638* (2013.01)

(58) Field of Classification Search
None
See application file for complete search history.

(56) References Cited

U.S. PATENT DOCUMENTS

| | | | | |
|---|---|---|---|---|
| 7,472,061 | B1 * | 12/2008 | Alewine | G10L 13/08 704/243 |
| 8,046,224 | B2 * | 10/2011 | Rajput | G10L 17/02 704/243 |
| 8,949,125 | B1 * | 2/2015 | Chechik | G10L 13/02 701/409 |
| 8,965,766 | B1 * | 2/2015 | Weinstein | G06F 17/3074 704/254 |
| 9,001,976 | B2 * | 4/2015 | Arrowood | G10L 15/07 379/88.01 |
| 9,135,912 | B1 * | 9/2015 | Strope | G10L 15/063 |
| 2005/0143970 | A1 * | 6/2005 | Roth | G10L 15/063 704/4 |
| 2005/0267757 | A1 * | 12/2005 | Iso-Sipila | G10L 13/08 704/260 |
| 2006/0173683 | A1 * | 8/2006 | Roth | G10L 15/183 704/251 |
| 2007/0016422 | A1 * | 1/2007 | Mori | G10L 13/08 704/260 |

(Continued)

*Primary Examiner* — Richemond Dorvil
*Assistant Examiner* — Thuykhanh Le
(74) *Attorney, Agent, or Firm* — Soroker Agmon Nordman

(57) ABSTRACT

A method for adapting a phonetic dictionary for peculiarities of a speech of an at least one speaker, comprising generating search pronunciations for a search term, retrieving audio sections from an audio database for each search pronunciation, audibly presenting to a person the audio sections of the speech of the at least one speaker, and updating the phonetic dictionary based on acceptability of the audio sections determined from judgments by the person regarding intelligibility of the audio sections in audibly pronouncing the provided at least one word, wherein the method is performed on an at least one computerized apparatus configured to perform the method.

16 Claims, 4 Drawing Sheets

(56) References Cited

U.S. PATENT DOCUMENTS

| | | | |
|---|---|---|---|
| 2007/0112554 A1* | 5/2007 | Goradia | G06F 17/2735 704/4 |
| 2008/0172234 A1* | 7/2008 | Eide | G10L 13/047 704/260 |
| 2008/0221890 A1* | 9/2008 | Kurata | G10L 15/063 704/251 |
| 2008/0307339 A1* | 12/2008 | Boro | G06F 7/06 715/764 |
| 2009/0043581 A1* | 2/2009 | Abbott | G10L 15/187 704/254 |
| 2009/0319270 A1* | 12/2009 | Gross | G10L 15/22 704/246 |
| 2010/0100385 A1* | 4/2010 | Davis | G10L 13/00 704/260 |
| 2011/0157420 A1* | 6/2011 | Bos | G10L 15/265 348/231.2 |
| 2012/0203776 A1* | 8/2012 | Nissan | G06F 17/30746 707/728 |
| 2012/0233207 A1* | 9/2012 | Mohajer | G06F 17/30684 707/769 |
| 2012/0239402 A1* | 9/2012 | Washio | G10L 15/02 704/251 |
| 2013/0191126 A1* | 7/2013 | Thambiratnam | G10L 15/187 704/245 |
| 2013/0262126 A1* | 10/2013 | Schalk | G01C 21/26 704/275 |
| 2013/0294587 A1* | 11/2013 | Arrowood | G10L 15/07 379/88.01 |
| 2014/0006029 A1* | 1/2014 | Stanley | G10L 15/19 704/254 |
| 2014/0129218 A1* | 5/2014 | Liu | G10L 15/32 704/231 |
| 2014/0142925 A1* | 5/2014 | Gish | G10L 15/063 704/10 |
| 2014/0201126 A1* | 7/2014 | Zadeh | G06K 9/627 706/52 |
| 2014/0257815 A1* | 9/2014 | Zhao | G10L 13/08 704/260 |
| 2014/0379709 A1* | 12/2014 | Mack | G09B 19/04 707/732 |
| 2015/0112679 A1* | 4/2015 | Zhang | G10L 15/187 704/243 |
| 2015/0154953 A1* | 6/2015 | Bapat | G10L 15/06 704/251 |
| 2015/0170648 A1* | 6/2015 | King | G06F 3/167 704/235 |
| 2015/0199401 A1* | 7/2015 | Polehn | G10L 17/22 707/765 |
| 2015/0248881 A1* | 9/2015 | Holdren | G10L 15/06 704/260 |
| 2015/0331939 A1* | 11/2015 | Burgmeier | G06F 17/30297 707/733 |
| 2015/0380010 A1* | 12/2015 | Srinivasan | H04R 1/406 704/227 |
| 2016/0133155 A1* | 5/2016 | Lee | G09B 19/04 434/157 |
| 2016/0155437 A1* | 6/2016 | Kanevsky | G10L 15/22 704/254 |

\* cited by examiner

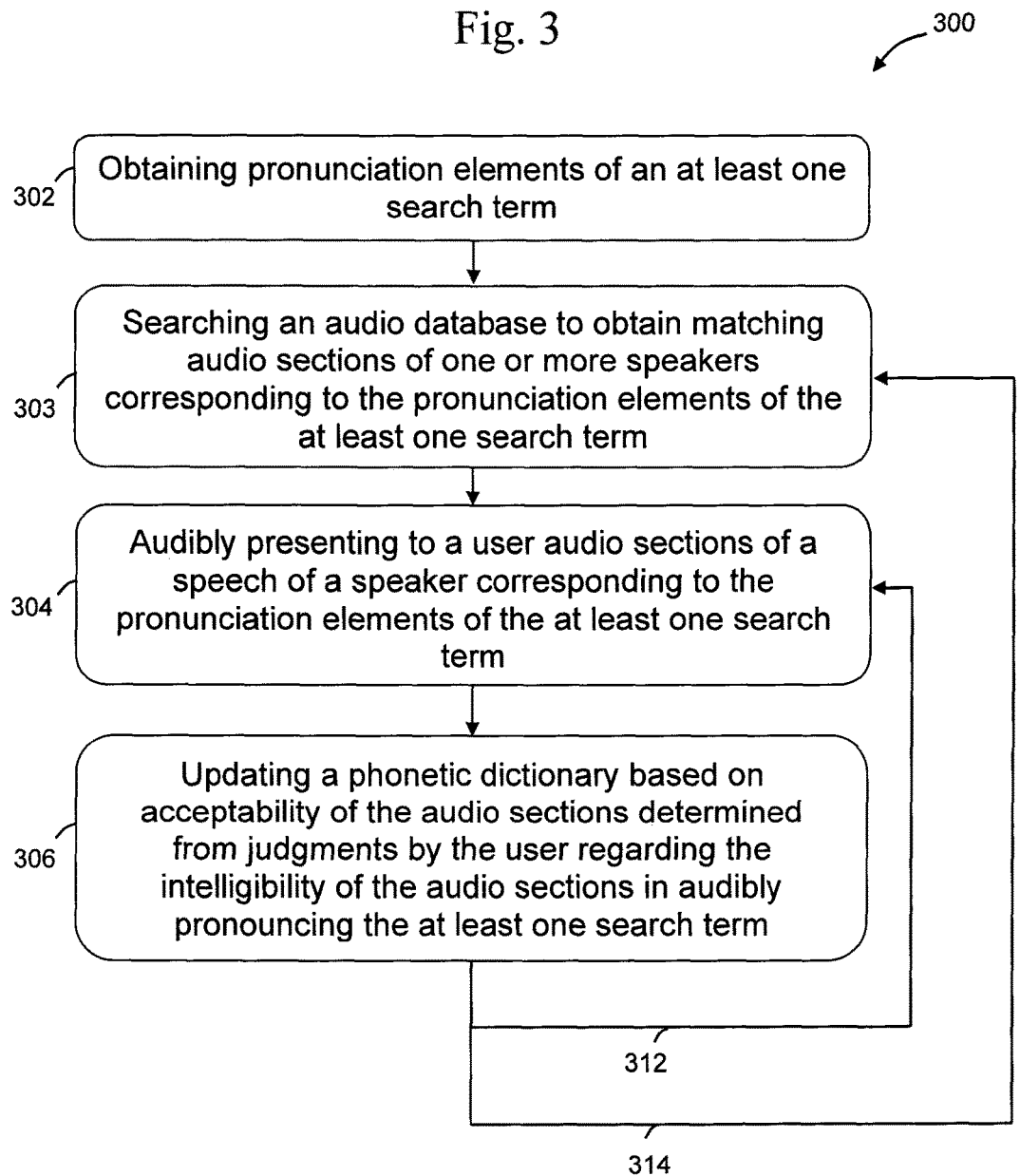

USER-AIDED ADAPTATION OF A PHONETIC DICTIONARY

BACKGROUND

The present disclosure, generally relates to audio retrieval and more specifically to adaptation of a phonetic dictionary.

Adaptation of acoustic models is known in the art. For example, U.S. Pat. No. 8,515,753 that reports an acoustic model adaptation method for enhancing recognition performance for a non-native speaker's speech, or U.S. Pat. No. 8,046,224 that reports adaptation of existing acoustic models to a speaker, or US 2013/0294587 that reports performing speaker adaptation including acoustic model adaptation.

SUMMARY

One exemplary embodiment of the disclosed subject matter is a method for adapting a phonetic dictionary for peculiarities of a speech of an at least one speaker, comprising generating search pronunciations for a search term, retrieving audio sections from an audio database for each search pronunciation, audibly presenting to a person the audio sections of the speech of the at least one speaker, and updating the phonetic dictionary based on acceptability of the audio sections determined from judgments by the person regarding intelligibility of the audio sections in audibly pronouncing the provided at least one search term wherein the method is performed on an at least one computerized apparatus configured to perform the method.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, and may not be repeatedly labeled and/or described.

Figure 1A:
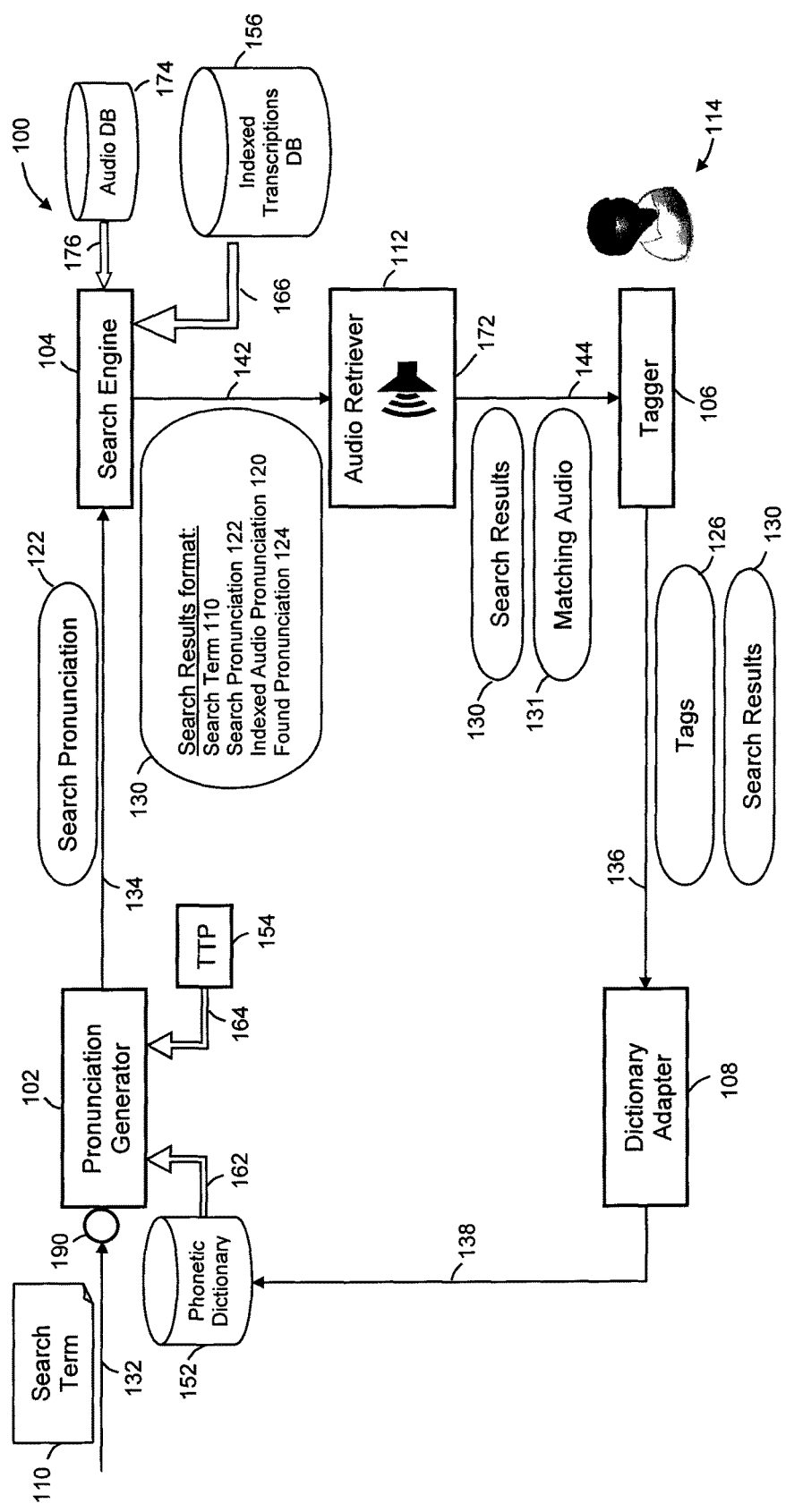

References to previously presented elements are implied without necessarily further citing the drawing or description in which they appear.

Figure 1B:
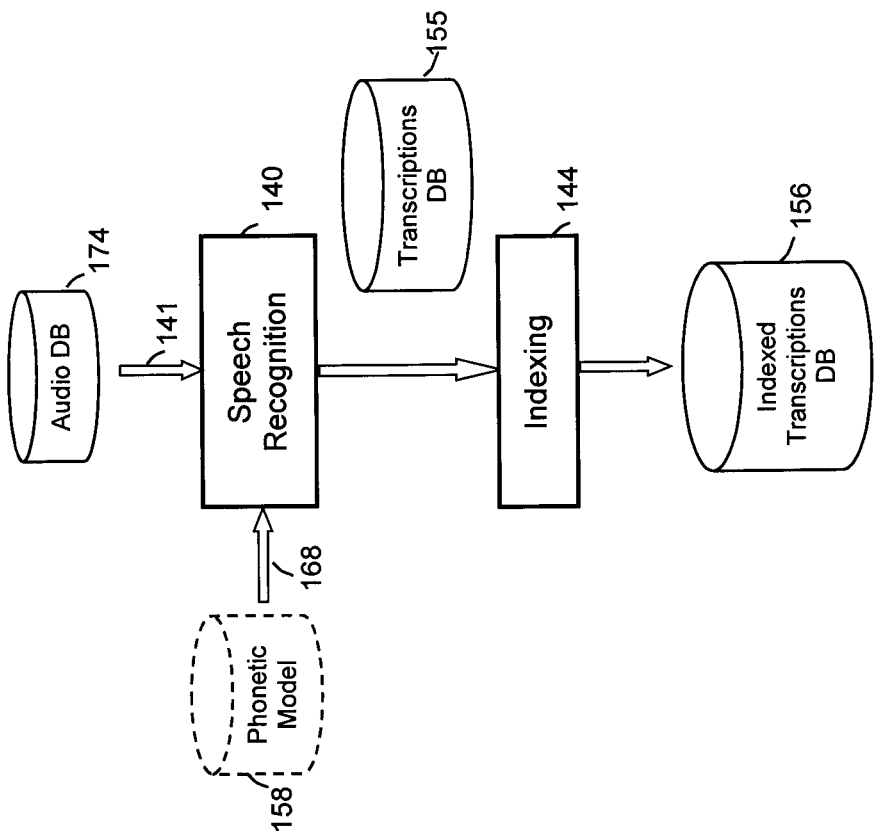
Figure 2:
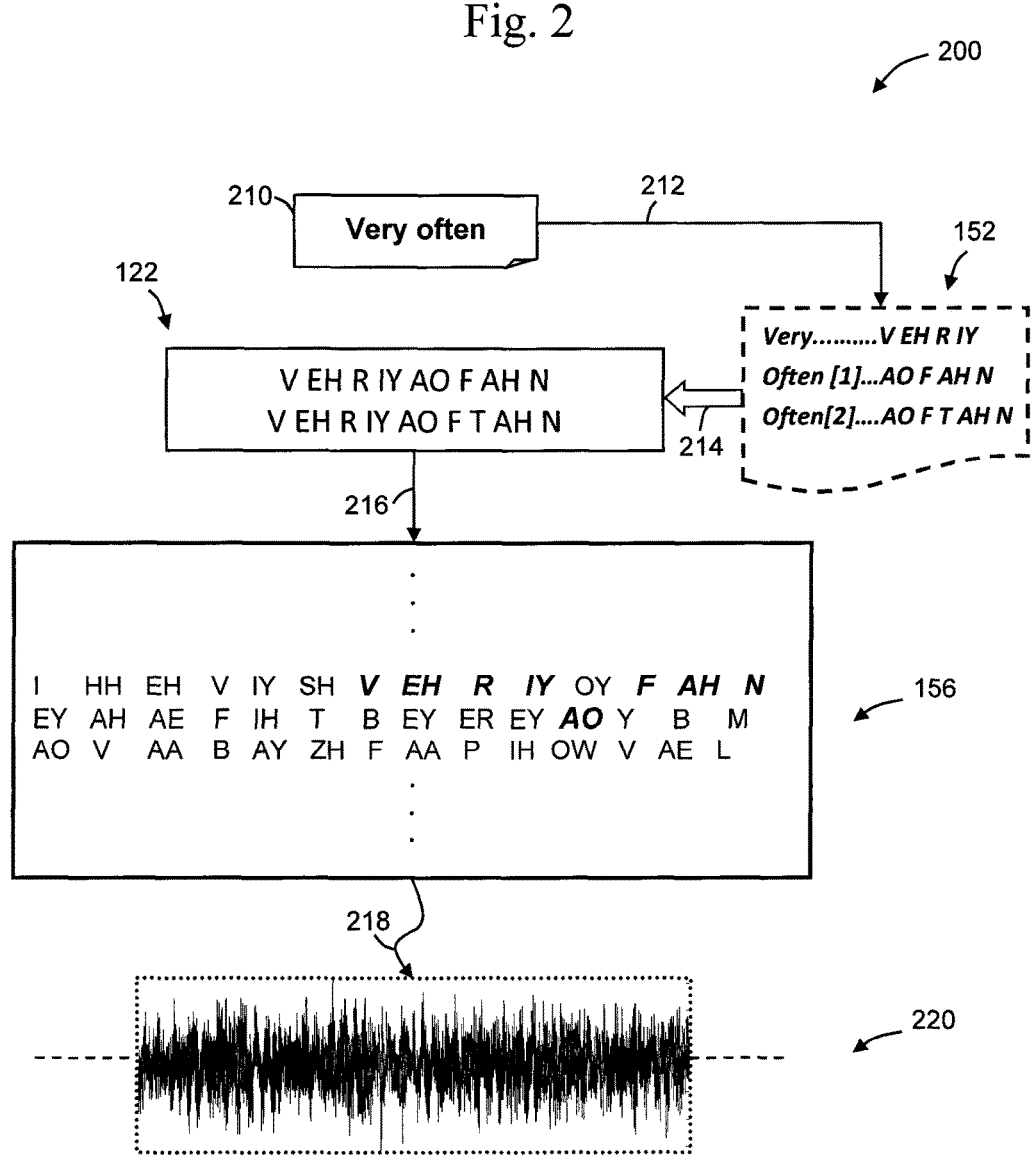

FIG. 1A schematically illustrates a system for adaptation of a phonetic dictionary, according to exemplary embodiments of the disclosed subject matter;

FIG. 1B schematically illustrates a system for generating an indexed transcriptions database according to exemplary embodiments of the disclosed subject matter:

FIG. 2 schematically illustrates a procedure for obtaining an audio section corresponding to a given pronunciation, according to exemplary embodiments of the disclosed subject matter; and FIG. 3 outlines operations in adapting a phonetic dictionary, according to exemplary embodiments of the disclosed subject matter.

DETAILED DESCRIPTION

For brevity and clarity and without limiting, in the present disclosure a phonetic element and a pronunciation element implies one or more of a speech ingredient in a phonetical level and/or syllable level and/or sub-word level such as a phoneme and/or n-gram (sequence of phonemes), expressed as a symbol and/or a sequence of symbols. For example, the sound of 'X' may be represented as a sequence of symbols for the sounds of 'K' and 'S'.

In the context of the present disclosure, without limiting, an 'acoustic model' implies a model containing information on the probabilistic mapping between phonemes and acoustic features as statistical representations of the sounds that make up words.

In the context of some embodiments of the present disclosure, without limiting, a 'phonetic dictionary', referred to also as a dictionary, implies a construct such as a table that maps between words and representations pronunciation thereof as phonetic elements that represent a corresponding pronunciation. Optionally, a plurality or pronunciations representations for a word are included in the phonetic dictionary this representing a plurality of pronunciation variations for a word.

In the context of the present disclosure, without limiting, an 'audio database' implies a set of sufficiently large corpus of speech of one or more speakers.

In the context of the present disclosure, without limiting, a 'phonetic model' implies a speech recognition model that is fitted to recognize speech elements in a phonetical level, a syllable level, a word level or a combination of the cited levels. The recognition output may be in a form of a lattice, N-Best or 1-best or in any suitable manner as known in the art.

In the context of the present disclosure, without limiting, an 'indexed transcriptions database' implies a set of transcriptions of speech that are generally indexed or otherwise constructed for rapid detection or retrieval. The indexed transcriptions database is generally, without limiting, generated by recognition of a provided speech such as in an audio database by a speech recognition system and/or apparatus such as known in the art, based on and/or facilitated by a phonetic model.

In the context of the present disclosure, without limiting, a 'user' implies a person.

The terms cited above denote also inflections and conjugates thereof.

One technical problem dealt by the disclosed subject matter is enhancing the capability of speech retrieval apparatus employing a phonetic dictionary for handling various audio pronunciations such as of non-native speakers of a language or audio pronunciations of certain dialects.

One technical solution according to the disclosed subject matter is obtaining representations in terms of phonetic elements of given word expressions or search terms, either from the phonetic dictionary or by text to phonemes mechanism. This representation is denoted as a "search pronunciation". Thereafter retrieving audio sections for the search pronunciations from a provided speech corpus of one or more speakers, such as by searching a database of transcriptions configured to tack speech segments. This database is denoted as an "indexed transcriptions database". The indexed transcriptions database may be generated by decoding the audio database with speech recognizer configured by phonetic model. After the decoding process, an indexing operation is performed on the transcriptions to yield an indexed transcriptions database which is efficient for audio retrieval. The given words may be provided as search terms in a framework or context of a search.

Each retrieved result from the search operation may include a data set comprising the search term, a search pronunciation, the "found" pronunciation and the audio section or an index to the audio section in an audio database. The found pronunciation refers to the phonetic representation as recognized by the speech engine and stored in the indexed transcriptions database. The retrieved audio sections are audibly sounded to a person that judges whether the audible pronunciations of the given words or search terms is either (i) sufficiently intelligible and match the search term, denoted also as positive, or (ii) the audible pronunciations of the given words is illegible or don't match the search term, denoted also as negative. Thus, each retrieved result is paired with a tag, the latter being either positive or negative, where each pair is regarded as a positive or a negative pair, respective to the judgment by the person.

The set of all retrieved results with matching tags, referred to as tagged results, are processed to yield an efficiency level or confidence quantification, for each pair of pronunciation (either "search pronunciation" or "found pronunciation") and matching search term. The efficiency level measures the effectiveness of the pronunciation to serve for the search operation in the retrieval task. The efficiency measure can be for example a ratio between the number of positively tagged retrieved results, which include the pair of pronunciation and search term, to the total number of retrieved results that include the pair.

Based on the efficiency levels the phonetic dictionary is updated to potentially improve the phonetic representation of words as suitable for certain speakers. The update may include the addition of pronunciations or the removal of pronunciations. For example, word and pronunciation pairs which have an efficiency level which is higher than a first threshold will be added or maintained in the dictionary. Word and pronunciation pairs which have an efficiency level which is lower than a second threshold will be removed if they are contained in the dictionary. The thresholds may be configurable, or may be predetermined in the system.

Thus, the phonetic dictionary is adapted to cope with variants and/or peculiarities of pronunciations of speakers, for example, pronunciations of non-native speakers of a language or pronunciations of certain dialects.

In some embodiments, the process described above is repeated one or more times to verify that the phonetic dictionary is properly adapted and/or to further iteratively adapt of the phonetic dictionary such as to achieve acceptable pronunciations.

A potential technical effect of the disclosed subject matter is a speech analysis apparatus adapted and/or adaptable with a phonetic dictionary for handling various accents and/or audio pronunciations variations.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

FIG. 1A schematically illustrates a system 100 for adaptation of a phonetic dictionary, denoted also as phonetic dictionary 152, according to exemplary embodiments of the disclosed subject matter.

System 100 schematically illustrates data repositories and control and data flow between operational components, or modules, involved in the adaptation of phonetic dictionary 152, as further described below.

The adaptation or updating of phonetic dictionary 152 is based on one or more terms or words where the corresponding audio pronunciations thereof are audibly delivered and judged by a person. Accordingly, for brevity and clarity, the one or more terms are also collectively denoted as search terms and the person is denoted as an appraiser.

By way of example, the description below with respect to system 100 relates to one word that represents the search terms that are consecutively provided.

As schematically illustrated by an arrow 132, a word or search term, denoted as search term 110, is provided to a pronunciation generator, denoted also as a pronunciation generator 102.

Search term 110 is searched and/or otherwise looked for in phonetic dictionary 152, as illustrated schematically by an arrow 162.

In case search term 110 is found in phonetic dictionary 152, the phonetic elements of search term 110 are retrieved by pronunciation generator 102, as further indicated by arrow 162, and provided as an output of pronunciation generator 102.

In case search term 110 is not found in phonetic dictionary 152, the phonetic elements of search term 110 are determined by a mechanism of text-to-phonemes which is denoted a TTP 154, and provided to pronunciation generator 102 as illustrated schematically by an arrow 164. The determined phonetic elements of search term 110 are provided as an output of pronunciation generator 102. In case search term 110 contains a plurality of words, and a portion of these words is found in phonetic dictionary 152 while another portion is not found in phonetic dictionary 152, the phonetic representations from phonetic dictionary 152 and TTP 154 may be concatenated to form a sequence of phonemes.

The text-to-phonemes mechanism is operative according to methods of the art, example as in US2007/0233490 or US2011/0054903 or US2004/0073423 or in http://leons-planet.com/phono.htm.

Search Engine

The output of pronunciation generator 102, denoted as search pronunciation 122, comprises either the phonetic elements retrieved from phonetic dictionary 152, or the determined phonetic elements determined by TTP 154 from search term 110 or a sequence of phonemes concatenated from both dictionary 152 and TTP 154.

In some embodiments, such as in order to reduce or eliminate ambiguity when deciding on the nature of pronunciation and quantification thereof described below, in case the number of pronunciations of search term 110 is less than a threshold, denoted as φ, then further pronunciations for search term 110 up to φ are generated by TTP 154 and added to search pronunciation 122.

As illustrate by and arrow 134, search pronunciation 122 is provided to a search component or module, denoted also as search engine 104. As illustrated schematically by an arrow 166, search engine 104 looks up in an indexed transcriptions database, denoted also as indexed transcriptions DB 156, and searches in indexed transcriptions DB 156 to identify by some metric sequences of phonetic elements that match and/or resemble and/or correspond to search pronunciation 122.

Reference is now made to FIG. 1B, which illustrates a system for generating an indexed transcriptions DB 156 according to embodiments of the present disclosure. Generally, indexed transcriptions DB 156 is generated by a speech recognition model 140 as shown in FIG. 1B, which is applied on provided speech, stored for example in an audio database 174 described below, as illustrated schematically by an arrow 141, based on a phonetic model, denoted also as a phonetic model 158, as illustrated schematically by an arrow 168. The processes of speech recognition, indexing and searching are described, for example, in Chelba, Ciprian, et al. *"Speech Retrieval," Spoken Language Understanding: Systems for Extracting Semantic information from Speech* (2011): 417-446.

The output of speech recognition model 140, is a transcriptions database 155 which stores the decoding results, for example in the form of lattice, 1-best or N-best containing symbolic elements as sub-words (e.g. phonemes or syllables) or words. The indexing unit 144 modifies transcriptions database 155 to a structure suitable for efficient retrieval of audio sections or files from the audio database 174 according to a query of symbolic elements or sequences of symbolic elements, to obtain the indexed transcriptions database 156. An example of an indexing operation can be found, for example, in: Liu, Chao, Dong Wang, and Javier Tejedor. "N-gram FST Indexing for Spoken Term Detection", INTERSPEECH, 2012.

Referring back to FIG. 1A, the identified phonetic sequences are collectively denoted also as found pronunciations 124 and are provided as part of the output or search results 130 of search engine 104 along with indication, such as by an index to the audio database, of the corresponding audio sections, denoted also as indexed audio pronunciations 120. The search results 130 further include the corresponding search term 110 and the corresponding search pronunciation 122. The search operation may also use the original audio or features extracted from it in order to extract the identified search results, as illustrated by arrow 176.

The metric for identifying the found pronunciations is based on methods of the art, such as by Minimum Edit distance described for example in http://sail.usc.edu/~audhkhas/docs/audhkhasi_kws_icassp07.pdf.

Having used the metric to identify pronunciations, some pronunciations in indexed transcriptions DB 156 might inadequately resemble search pronunciation 122 such as due to correlation with insufficient confidence or certainty. Such pronunciations, denoted also as uncertain pronunciations are excluded from found pronunciations 124.

As indicated by an arrow 142, the search results 130 including, inter alia, indexed audio pronunciations 120 are provided to a component or module, denoted also as an audio retriever 112 that retrieves and/or accesses from the audio database 174 matching audio sections 131 of one or more speakers as indicated by indexed audio pronunciations 120. Exemplary description regarding audio retrieval can be found in Chelba, Ciprian, et al. "Speech Retrieval." Spoken Language Understanding: Systems for Extracting Semantic Information from Speech (2011): 417-446.

Subsequently, audio retriever 112 audibly presents the matching audio sections 131 for evaluation or appraisal by a person having a role of a 'teacher' or of an appraiser that is figuratively illustrated also as an appraiser 114. It is noted that in some cases only one audio section is available in the speech of the one or more speakers.

The audio sections are audibly presented by a suitable apparatus employing a sounding component such as a loudspeaker or an earphone, collectively illustrated as a loudspeaker 172.

Appraiser 114 listens to the audio sections and determines or decides whether the audio section corresponding to search term 110 is sufficiently intelligible or ineligible with respect to search term 110. If the audio section is sufficiently intelligible, appraiser 114 designates the audio section as positive or as acceptable or as satisfactory, thus approving the pronunciation; and if audio section is ineligible, appraiser 114 designates the audio section as negative or as unacceptable or as unsatisfactory, thus disapproving the pronunciation. The determination of the audible pronunciations at least as positive is based on some confidence of intelligibility as judged by appraiser 114.

Table-1 below illustrates by way of example decision for acceptability of pronunciations.

TABLE 1

| Word/Search Term | Search Pronunciation | Found Pronunciation | Decision |
|---|---|---|---|
| Yes | Y EH S | Y EH | Positive |
| What | W AH T | W AH T | Positive |
| July | J UH L IH | J UH L IY | Negative |
| Bell | B EH L | B EH L | Negative |

The Word/Search Term column stands for a term such as search term 110 or word as described above. The Search Pronunciation column stands for the respective search pronunciation as search pronunciation 122. The Found Pronunciation column stands for the found pronunciation as found pronunciations 124. The Decision column stands for the decision of appraiser 114.

For that end, as illustrated schematically by an arrow 144, the search results 130 along with the corresponding audio sections 131 are forwarded, to a component or module, denoted also as tagger 106, by which appraiser 114 tags or marks the audio sections corresponding to the search results as positive or negative according to a determination of the audio sections by appraiser 114.

Thus, as illustrated schematically by an arrow 136, the output of tagger 106 includes the search results 130 with corresponding tags for each result denoted as tags 126.

The outputs of tagger 106, including search results 130 and corresponding tags 126, are forwarded to a component or module, denoted also as dictionary adapter 108, which indicates how to handle these outputs with respect to phonetic dictionary 152 and/or how to manipulate and/or update phonetic dictionary 152 according to these outputs.

A pair constructed of search term 110 and one of the pronunciations (either search pronunciation or found pronunciation) may have a plurality of designations or tagging as positive or negative which yields uncertainty whether the pronunciations of search term 110 is indeed to be considered as effective for search operation or ineffective. Therefore, dictionary adapter 108 evaluates the pairs by some measure or statistic to obtain efficiency level or a confidence quantification indicative whether a certain pronunciation (either search pronunciation or found pronunciation) of search term 110 is indeed effective or ineffective for subsequent searches when or if the process described herein should be repeated or iterated, as described herein.

In case the confidence quantification is above a threshold, denoted as θ, dictionary adapter 108 indicates or specifies that the pronunciation of search term 110 is effective and should be added to phonetic dictionary 152. Otherwise, in case the confidence quantification is below a threshold, denoted as ψ, dictionary adapter 108 indicates or specifies that a certain pronunciation of search term 110 is not effective and should be removed from phonetic dictionary 152.

In some embodiments, the efficiency measure or confidence quantification may be calculated, for example as a ratio between the number of positively tagged retrieved results, which include the pair of pronunciation and search term, to the total number of retrieved results that include the pair.

In some embodiments, thresholds θ and ψ are adjusted to reduce ambiguity when the confidence quantification is between θ and ψ, yet intermediate cases where the quantification is between θ and ψ are ignored.

Table-2 below illustrates, by way of example and in view of the example above, derivation of confidence quantification by a ratio as described above.

TABLE 2

| Word/Search Term | Pronunciation | Pronunciation Type | Positive Count | Negative Count | Confidence Quantification |
|---|---|---|---|---|---|
| Yes | Y EH S | Search | 5 | 12 | 29.4% |
| What | W AH T | Found | 12 | 0 | 100% |
| July | J UH L IH | Search | 3 | 17 | 15% |
| Bell | B EH L | Search | 45 | 55 | 45% |

The Word/Search Term column stands for a term such as search term 110 or search terms as described above. The Pronunciation column stands for the pronunciation of the Word/Search Term denoted 'Search Pronunciation' when obtained from phonetic dictionary 152 or denoted 'Found Pronunciation' when obtained from indexed transcriptions DB 156. The Pronunciation Type column stands for the search pronunciation as search pronunciation 122 or found pronunciation as found pronunciations 124. The Positive Count and Negative counts columns stand for the number of occurrences positive decision and negative decisions, respectively. The confidence quantification column stands for the confidence quantification by the ratio described above and expressed by percentage.

Consequently, as schematically illustrated by an arrow 138, dictionary adapter 108 adapts or updates phonetic dictionary 152 as follows:

If the pronunciations of search term 110 are specified or determined to be added to is phonetic dictionary 152, dictionary adapter 108 operates as follows:

In case search term 110 and approved pronunciations thereof were not included in phonetic dictionary 152 then search term 110 and the pronunciations thereof are added to phonetic dictionary 152;

In case search term 110 and pronunciations thereof were already included in phonetic dictionary 152 then phonetic dictionary 152 is not affected;

In case search term 110 was already included in phonetic dictionary 152 but not the approved pronunciation thereof then the pronunciation of search term 110 is updated in phonetic dictionary 152 by the approved pronunciation.

If the pronunciations of search term 110 are specified or determined to be removed from phonetic dictionary 152, dictionary adapter 108 operates as follows:

In case search term 110 and pronunciations thereof were already included in phonetic dictionary 152 then the pronunciations of search term 110 are removed from phonetic dictionary 152;

In case search term 110 was not included in phonetic dictionary 152 then phonetic dictionary 152 is not affected.

Table-3 below illustrates, by way of example and in view of the examples above, determination directed how to update phonetic dictionary 152.

TABLE 3

| Word/Search Term | Pronunciation | Add/Remove |
|---|---|---|
| Yes | Y EH S | Add |
| What | W AH T | Remove |

The Word/Search Term column stands for a term such as search term 110 or words as described above. The Pronunciation column stands for the found pronunciation as found pronunciations 124 or search pronunciation 122. The Add/Remove columns stand for the determination whether to add or remove the pronunciation to or from phonetic dictionary 152.

In some embodiments, the process described above is repeated or iterated anew, namely, from the beginning indicated as by a circle 190. Optionally or additionally, a plurality of repetitions are carried out to further adapt or enhance phonetic dictionary 152 such as due to additional pronunciations and/or additional search terms and/or additionally provided speech and/or another phonetic model 156. The number of repetitions may be pre-set and/or determined such as until phonetic dictionary 152 is not further affected. Optionally or additionally, a plurality of repetitions are carried out to verify that all the pronunciations of search term 110 are effective as described above.

Thus, based on the judgment or feedback of appraiser 114 to sounded audio obtained from one or more speakers, phonetic dictionary 152 is adapted to the one or more speakers possibly having pronunciation peculiarities such as foreign accent or dialect pronunciation. Consequently, when phonetic dictionary 152 as adapted is employed in a speech analysis apparatus, the likelihood of reliably identifying the distinctive accent or articulation of the one or more speakers is increased.

It is noted that the functionalities of modules or components of system 100 subscribed above are according to some embodiments. In some other embodiments a functionality of one module or component may be combined, at least partly, in another module or component. For example, the functionalities of audio retriever 112 and as tagger 106 may be combined; or, for example, the functionalities of tagger 106 and dictionary adapter 108 may be combined; or, for example, the functionality of audio retriever 112 may be combined with search engine 104.

It is further noted that the data produced and/or passed between modules or components of system 100 as described above are according to some embodiments. In some other embodiments at least some of the data is included in a data structure and/or an assembly of items. For example, the output of search engine 104 may comprise multiple items as or equivalent to search pronunciation 122, found pronunciations 124, index or indication where to locate audio sections corresponding to found pronunciations 124, as well as, at least optionally, one or more of phrase certainty according to the distance, and/or the audio sections. The data structure of assembly may be further transferred to one or more of the modules or components. Optionally, other methods of transferring data to and/or from modules or components may be used such as according to pointers or links.

It is noted that one or more of the components or modules of system 100 are implemented in one or more computers and/or processors. Likewise, TTP 154 is implemented in one or more computers and/or processors. Further, phonetic dictionary 152 and/or phonetic model 156 are implemented in a storage medium and/or circuitry accessible by computers and/or processor or any suitable circuitry. Accordingly, system 100 is a computerized apparatus comprising a computer and/or processor.

Audio of Pronunciation

FIG. 2 schematically illustrates a procedure 200 for obtaining an audio section corresponding to a given pronunciation as or like in system 100, according to exemplary embodiments of the disclosed subject matter.

Search terms akin to one or more search terra 110 are illustrated as search terms 210, exemplified as 'very often'.

By way of example, it is assumed that search terms 210 are included in phonetic dictionary 152, along with pronunciations thereof. Thus, as illustrated by an arrow 212 and an arrow 214 which are akin to arrow 162, the pronunciations of search terms 210 are obtained from phonetic dictionary as or similar to search pronunciation 122.

It is noted that by the example phonetic dictionary 152 includes two entries for the term 'often' with corresponding two variations of pronunciations thereof, and, thus, search pronunciation 122 or similar thereto have two variations of 'very often'.

Indexed transcriptions DB 156 is searched for search terms 210, as indicated by an arrow 216 akin to arrow 166, and one variation of 'very often' is identified in the pronunciation of indexed transcriptions DB 156, namely, 'V EH R IY AO F AH N', as indicated by the emphasized bold italic pronunciations.

An audio section of one or more speakers corresponding to the identified pronunciation, illustrated as a signal 220, is obtained by an index or by any correspondence mechanism such as pointer or a link, as schematically illustrated by a curved arrow 218.

The audio section is audibly presented to a person such as appraiser 114 which provides feedback denoting whether the speech of search terms 210 by the one or more speakers is sufficiently intelligible or acceptable with respect to search terms 210.

In some embodiments, in case one or more of search terms 210 are not included in phonetic dictionary 152 then a text-to-phonemes (TTP) or text to speech mechanism is used instead to substitute the missing pronunciations.

The dots shown in phonetic model 156 indicate continuations thereof. Likewise, the dashed lines in signal 220 indicate continuation thereof to other sections of the one or more speakers corresponding to other possibly identified pronunciations.

It is noted that the arrows in procedure 200 are presented to illustrate relations between the parts of procedure 200 rather than a strict control flow.

FIG. 3 outlines operations 300 in adapting a phonetic dictionary, according to exemplary embodiments of the disclosed subject matter.

In operation 302 pronunciation elements of an at least one search term or word are obtained.

In some embodiments, in case the at least one search term and pronunciation elements thereof are included in the phonetic dictionary, then the pronunciation elements are obtained from the phonetic dictionary; otherwise, the pronunciation elements of the at least one search term are generated by a text-to-phonemes mechanism applied to the at least one search term.

In some embodiments, the at least one search term comprises a plurality of words, such as a plurality of search terms.

In operation 303, a search of a pronunciation in an audio database, e.g. audio database 174 of FIG. 1A, is performed to obtain matching audio sections of one or more speakers corresponding to the pronunciation elements of the at least one search term.

In some embodiments, the audio sections obtained using a search performed over an indexed transcriptions database, such as by searching in the indexed transcriptions database for phonetic elements that match and/or resemble and/or correspond to the pronunciation elements of an at least one search term, and retrieving the audio sections based on indications of the locations thereof comprised in the indexed transcriptions database.

In operation 304 audio sections of a speech of speaker corresponding to the pronunciation elements of the at least one search term are audibly presented to a person in a role of a teacher or an appraiser.

In operation 306 the phonetic dictionary is updated based on acceptability of the audio sections determined by judgments of the person regarding the intelligibility, with respect to the at least one search term, of the audio sections in audibly pronouncing the at least one search term.

In some embodiments, the acceptability of the pronunciations is determined based on a confidence quantification of a plurality of decisions of the person in judging the intelligibility of the audio sections audibly pronouncing the at least one search term.

In some embodiments, operation 304 and operation 306 are repeated or iterated at least one time, as indicated by an arrow 312, in order to further verify the confidence quantification of the pronunciations and search term pairs.

In some embodiments, operation 302, operation 303, operation 304 and operation 306 are repeated or iterated at least one time, as indicated by an arrow 314, in order to further adapt the phonetic dictionary 152.

There is thus provided according to the present disclosure a method for adapting a phonetic dictionary for peculiarities of a speech of an at least one speaker, comprising generating search pronunciations for a search term, retrieving audio sections from an audio database for each search pronunciation, audibly presenting to a person the audio sections of the speech of the at least one speaker, and updating the phonetic dictionary based on acceptability of the pronunciations in the audio sections as determined from judgments by the person regarding intelligibility of the audio sections in audibly pronouncing the provided at least one word or search term, wherein the method is performed on an at least one computerized apparatus configured to perform the method. In some embodiments, in case an efficiency measure or confidence quantification of a search term and pronunciation pair is above a certain threshold, the pair is determined as acceptable. In this case, if the search term is included in the phonetic dictionary then the phonetic dictionary is updated by updating the pronunciation elements of the provided at least one word or search term in the phonetic dictionary. If the search term is not included in the phonetic dictionary, then the phonetic dictionary is updated by adding the provided at least one word or search term and the pronunciation elements thereof to the phonetic dictionary.

In some embodiments, in case an efficiency measure or confidence quantification of a search term and pronunciation pair is below a certain threshold, the pair is determined as unacceptable. In this case, if the provided at least one word or search term is included in the phonetic dictionary then the phonetic dictionary is updated by removing from the phonetic dictionary the pronunciation elements related to the provided at least one word or search term.

In some embodiments, in case the provided at least one word or search term is included in the phonetic dictionary then the pronunciation elements of the provided at least one word or search term are obtained from the phonetic dictionary.

In some embodiments, in case the provided at least one word or search term is not included in the phonetic dictionary then the pronunciation elements of the provided at least one word or search term are obtained from a text-to-phonemes mechanism operated on the provided at least one word or search term.

In some embodiments, in case the provided at least one word or search term contains few words and part of them are found in the dictionary while others are not found then the phonetic representation from the dictionary and TTP will be concatenated to form a unified sequence of phonemes.

In some embodiments, the audio sections are retrieved from the speech of the at least one speaker in locations that correspond to the pronunciation elements of the provided at least one word or search term.

In some embodiments, the efficiency measure of a pronunciation with respect to a search term is determined in a cumulative manner, based on a plurality of decisions of the person in judging the intelligibility of the sections audibly pronouncing the provided at least one word or search term.

In some embodiments, the provided at least one word or search term comprises a plurality of provided words or search terms.

In some embodiments, the speech of the at least one speaker comprises speech of a plurality of speakers.

In some embodiments, the audio sections comprise one section.

In some embodiments, the method is further repeated at least one time.

In some embodiments, the method is further repeated or iterated in order to acceptably update of the phonetic dictionary according to an at least one provided criterion.

There is thus further provided according to the present disclosure a computerized apparatus configured to carry out the method described above.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor or a micro-processor, RISC processor, or DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry.

The processor and program may constitute the same apparatus, at least partially, such as an array of electronic gates, such as FPGA OF ASIC, designed to perform a programmed sequence of operations, optionally comprising or linked with a processor or other circuitry.

The term computerized apparatus or a computerized system or a similar term denotes an apparatus comprising one or more processors operable or operating according to one or more programs.

As used herein, without limiting, a module represents a part of a system, such as a part of a program operating or interacting with one or more other parts on the same unit or on a different unit, or an electronic component or assembly for interacting with one or more other components.

As used herein, without limiting, a process represents a collection of operations for achieving a certain objective or an outcome.

The term 'configuring' and/or 'adapting' for an objective, or a variation thereof, implies using at least a software and/or electronic circuit and/or auxiliary apparatus designed and/or implemented and/or operable or operative to achieve the objective.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising" and/or "having" when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A method for adapting a phonetic dictionary for peculiarities of a speech of at least one speaker, the method comprising:
   a. receiving a search term in text form;
   b. searching for the search term in the phonetic dictionary, wherein if the search term or a portion thereof is included in the phonetic dictionary,
      obtaining from the phonetic dictionary pronunciation elements corresponding to phonetic elements of the search term or a portion thereof, for serving as search pronunciations of the search term or portion thereof, and if the search term or portion thereof is not included in the phonetic dictionary, generating pronunciation elements corresponding to phonetic elements of the search term or portion thereof with a text to phoneme model (TTP); and concatenating all the obtained and generated pronunciation elements of the search term to form a search pronunciation of the search term;

c. searching by the formed search pronunciation for a matching phonetic transcription in an indexed transcriptions database, wherein the indexed transcriptions database stores phonetic transcriptions of a corresponding audio database of recorded human speech; wherein the searching yields a found pronunciation;

d. retrieving an audio section corresponding to the matching phonetic transcription of the found pronunciation from the audio database;

e. audibly presenting to a person the audio section and tagging the audio section according to its acceptability for pronouncing of the search term to obtain a tagged search result;

f. calculating a value of acceptability efficiency level for the found pronunciation, as obtained from the indexed transcriptions database, wherein the value of acceptability determined by the tagging; and g. in case the calculated value of acceptability exceeds a certain threshold value and the found pronunciation, as obtained from the indexed transcriptions database, is not already included in the phonetic dictionary, adding the found pronunciation to the phonetic dictionary;

wherein the method is performed on an at least one computerized apparatus configured to perform the method.

2. The method according to claim 1, wherein the acceptability of the pronunciation corresponding to a search term is calculated according to a confidence quantification for all tagged results that include the pronunciation and the corresponding search term, and wherein the phonetic dictionary is updated according to the confidence quantification.

3. The method according to the claim 2, wherein if a certain pronunciation and search term pair are determined acceptable according to the confidence quantification calculated for the tagged search results, and if the search term is included in the phonetic dictionary, then the phonetic dictionary is updated to include the certain pronunciation for the search term.

4. The method according to the claim 2, wherein if a certain pronunciation and search term pair is determined acceptable according to the confidence quantification calculated for the tagged search results, and if the search term is not included in the phonetic dictionary, then the phonetic dictionary is updated to include the search term and the certain pronunciation.

5. The method according to the claim 2, wherein if a certain pronunciation and search term pair are determined as unacceptable according to the confidence quantification calculated for the tagged search results, and if the search term and pronunciation are included in the phonetic dictionary, then the phonetic dictionary is updated by removing the certain pronunciation from the dictionary.

6. The method according to the claim 1, wherein the audio sections corresponding to the search pronunciations are retrieved from the speech of the at least one speaker in locations that correspond to the pronunciation elements of the search term, and wherein the retrieval is performed based on a metric that measures the distance between the search pronunciation and the found or recognized pronunciation elements.

7. The method according to the claim 1, wherein the search term is comprised of a plurality of words.

8. The method according to the claim 1, wherein the speech of the at least one speaker comprises speech of a plurality of speakers.

9. The method according to claim 1, wherein the method is further repeated at least one time, and the dictionary is updated at least one time.

10. The method according to claim 1, wherein the method is further repeated in order to acceptably update the phonetic dictionary according to an at least one provided criterion.

11. The method according to claim 1, further comprising obtaining or generating multiple search pronunciations for the search term, wherein the number of search pronunciations for the search term is equal to or exceeds a threshold number of pronunciations.

12. The method according to claim 11, wherein the audio sections are retrieved from the speech of the at least one speaker in locations that correspond to the pronunciation elements of the provided at least one search term.

13. The method according to claim 11, wherein the provided at least one search term comprises a plurality of provided search terms.

14. The method according to claim 11, wherein the speech of the at least one speaker comprises speech of a plurality of speakers.

15. The method according to claim 11, the method is repeated at least one time.

16. A computerized apparatus configured to carry out the method according to claim 1.

* * * * *